(12) United States Patent
Boice et al.

(10) Patent No.: US 6,922,441 B2
(45) Date of Patent: Jul. 26, 2005

(54) METHOD FOR PERFORMING INTEGER DIVIDES WITHOUT PROPAGATION OF TRUNCATION ERROR

(75) Inventors: Charles Boice, Endicott, NY (US); Everett G. Vail, III, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 09/853,508

(22) Filed: May 11, 2001

(65) Prior Publication Data

US 2002/0168004 A1 Nov. 14, 2002

(51) Int. Cl.[7] ............................ H04N 7/12; H04N 11/02
(52) U.S. Cl. ............................ 375/240.01; 375/240.03; 375/240.07
(58) Field of Search ..................... 375/240.01, 240.03, 375/240.06, 240.07; 348/699, 700

(56) References Cited

U.S. PATENT DOCUMENTS

| | | |
|---|---|---|
| 5,559,557 A | 9/1996 | Kato |
| 5,686,963 A | 11/1997 | Uz et al. |
| 5,739,968 A | 4/1998 | Inoue et al. |
| 5,821,885 A | 10/1998 | Wise et al. |
| 5,828,907 A | 10/1998 | Wise et al. |
| 5,835,792 A | 11/1998 | Wise et al. |
| 5,854,658 A | 12/1998 | Uz et al. |
| 5,878,273 A | 3/1999 | Wise et al. |
| 5,913,031 A | 6/1999 | Blanchard |
| 5,984,512 A | 11/1999 | Jones et al. |
| 6,108,382 A | 8/2000 | Gringeri et al. |
| 6,160,847 A | 12/2000 | Wu et al. |
| 6,289,129 B1 * | 9/2001 | Chen et al. .................. 382/232 |
| 6,546,140 B1 * | 4/2003 | Hiranaka .................... 382/232 |

OTHER PUBLICATIONS

IBM Technical Disclosure Bulletin, vol. 38, No. 04, Apr. 1995, Matheny et al., Method to Produce, Divide and Square Root Results with User–Defined Accuracy, p. 623.

IBM Technical Disclosure Bulletin, vol. 34, No. 3, Aug. 1991, Slishman, Fast and Perfectly Rounding Decimal/Hexadecimal Conversions.

* cited by examiner

*Primary Examiner*—Chris Kelley
*Assistant Examiner*—Erick Rekstad
(74) *Attorney, Agent, or Firm*—Schmeiser, Olsen & Watts; William H. Steinberg (57) ABSTRACT

A method and structure for performing a sequence of integer divides without propagation of truncation error. During encoding and decoding of video signals, a buffer is dynamically filled with binary bits of encoded video data at a variable rate, and the data is subsequently removed from the buffer at a constant rate. Calculating the number of bits removed from the buffer as each video frame is processed requires integer divides with consequent truncation of the quotient. An accumulator is utilized for each integer divide to cumulatively store remainders generated by successive integer divides. If the accumulator accumulates to a value (A) that is no less than the divisor (D) of the associated integer divide, then the quotient is effectively increased by 1, and A is decremented by D, which compensates for the prior truncations and avoids a buffer overflow violation that may otherwise occur.

36 Claims, 9 Drawing Sheets

EXAMPLE OF BA_FINAL1 CALCULATIONS. ALL VALUES SHOWN ARE AT THE END OF THE ITERATION. ITERATION 0 REPRESENTS THE INITIALIZATION BLOCK 10 OF FIG. 1.

| Iteration | adj_rem_accum | ba_rem_adder | ba_rem_accum | e_adder | BA_FINAL1 |
|---|---|---|---|---|---|
| 0 | 0 |  | 0 |  |  |
| 1 | 320 | 0 | 6 | 0 | 878 |
| 2 | 640 | 0 | 12 | 0 | 878 |
| 3 | 960 | 0 | 18 | 0 | 878 |
| 4 | 280 | 1 | 25 | 0 | 878 |
| 5 | 600 | 0 | 1 | 1 | 879 |
| 6 | 920 | 0 | 7 | 0 | 878 |
| 7 | 240 | 1 | 14 | 0 | 878 |
| 8 | 560 | 0 | 20 | 0 | 878 |
| 9 | 880 | 0 | 26 | 0 | 878 |
| 10 | 200 | 1 | 3 | 1 | 879 |
| 11 | 520 | 0 | 9 | 0 | 878 |

*FIG. 4*

EXAMPLE OF BA_FINAL2 CALCULATIONS. ALL VALUES SHOWN ARE AT THE END OF THE ITERATION. ITERATION 0 REPRESENTS THE INITIALIZATION BLOCK 10 OF FIG. 1. ONLY "YES" ITERATIONS ARE SHOWN.

| Iteration | h_adj_rem_accum | h_ba_rem_adder | h_ba_rem_accum | h_adder | BA_FINAL2 |
|---|---|---|---|---|---|
| 0 | 0 | | 0 | | |
| 3 | 320 | 0 | 6 | 0 | 439 |
| 4 | 640 | 0 | 12 | 0 | 439 |
| 6 | 960 | 0 | 18 | 0 | 439 |
| 9 | 280 | 1 | 25 | 0 | 439 |
| 10 | 600 | 0 | 31 | 0 | 439 |
| 11 | 920 | 0 | 37 | 0 | 439 |
| 15 | 240 | 1 | 44 | 0 | 439 |
| 18 | 560 | 0 | 50 | 0 | 439 |
| 19 | 880 | 0 | 56 | 0 | 439 |
| 22 | 200 | 1 | 3 | 1 | 440 |
| 23 | 520 | 0 | 9 | 0 | 439 |

EXAMPLE ILLUSTRATING THE ALGORITHM OF FIG. 7. NUMBERS FOLLOWED BY AN ASTERISK (*) DENOTE THAT THE ACCUMULATOR $A_1$ OR $A_2$ HAS REACHED OR EXCEEDED ITS MAXIMUM ALLOWED VALUE IN THE ITERATION, RESULTING IN INCREMENTING B BY 1. NUMBERS FOLLOWED BY A DOUBLE ASTERISK (**) DENOTE THAT THE ACCUMULATOR B HAS REACHED OR EXCEEDED ITS MAXIMUM ALLOWED VALUE IN THE ITERATION, RESULTING IN INCREMENTING $Z_n$ BY 1.

| Iter (n) | $Q_{1n}$ | $R_{1n}$ | $A_1$ | $Q_{2n}$ | $R_{2n}$ | $A_2$ | $X_n$ | $Q_n$ | $R_n$ | B | $Z_n$ | Z |
|---|---|---|---|---|---|---|---|---|---|---|---|---|
| 0 | | | 0 | | | 0 | | | | 0 | | 0 |
| 1 | 5 | 1 | 3 | 10 | 2 | 2 | 25 | 4 | 1 | 1 | 4 | 4 |
| 2 | 5 | 1 | 6 | 10 | 2 | 0* | 25 | 4 | 1 | 3 | 4 | 8 |
| 3 | 5 | 1 | 9 | 10 | 2 | 2 | 25 | 4 | 1 | 4 | 4 | 12 |
| 4 | 5 | 1 | 2* | 10 | 2 | 0* | 25 | 4 | 1 | 1** | 5 | 17 |
| 5 | 5 | 1 | 5 | 10 | 2 | 2 | 25 | 4 | 1 | 2 | 4 | 21 |
| Post Processing | | | | | | | | | | | | 21.50 |

METHOD FOR PERFORMING INTEGER DIVIDES WITHOUT PROPAGATION OF TRUNCATION ERROR

BACKGROUND OF THE INVENTION

1. Technical Field

The present invention relates to a method and algorithm for performing a sequence of integer divides without propagation of truncation error.

2. Related Art

Real-time video systems requiring large network bandwidth generally have their video signals compressed so that the video signals may be efficiently transmitted from source to destination. An example of an emerging video compression standard is the Moving Picture Experts Group (MPEG) standard. Under MPEG, video frames are initially encoded (i.e., compressed) for efficient transmission, placed in a buffer, and subsequently decoded (i.e., uncompressed) for viewing.

During the encoding and decoding of video signals, a Video Buffering Verifier (VBV) buffer is dynamically filled with binary bits of encoded video data at a variable rate (in bits/frame), and the video data is subsequently removed from the buffer at a constant rate (in bits/frame) for decoding purposes. The constant bits/frame removal rate is referred to herein as an average bits/frame (BA), which is computed as $$BA = BR/FR \quad (1)$$

wherein BR is a bit rate in bits/second and FR is a frame rate in frames/sec. If integer arithmetic is used by buffer management software to compute BA, then Equation (1) should be recast into an integer format. For example if FR=29.97 frames/sec, then $$BA = BR/29.97$$
$$= BR/(30-0.03)$$
$$= BR/(30-30/1000)$$
$$= BR/(30(1-1/1000)) \quad (2)$$

Expanding $(1-1/1000)$ in a Taylor series, $$(1-1/1000)^{-1} = 1 + 1/1000 + \text{terms of second order and higher in } 1/1000 \quad (3)$$

Thus to first order, substitution of Equation (3) into Equation (2) yields:

$$BA = (BR + BR/1000)/30 \quad (4)$$

Equation (4) is a representation of Equation (1) to first order of $1/1000$. Unfortunately, integer division by 1000 and by 30 in Equation (4) causes truncation error, which results in a smaller computed value of BA than is the "true" value of BA. The "true" value of BA is the constant number of bits/frame physically removed, while the smaller computed value of BA is the bits/frame that the buffer management software tracks as being removed based on Equation (4). For example, if BR=29970 bits/sec, then using Equation (4) with floating point arithmetic yields a "true" value of 1000 bits/frame (actually 999.999 bits/frame) for BA, but using Equation (4) with integer divides by 1000 and 30 yields a smaller computed of 999 bits/frame for BA. Accordingly with integer divides, the buffer management software would account for removal of video data at 999 bits/frame from the VBV buffer, while in actuality 1000 bits/frame is physically removed from the VBV buffer. If B represents the number of bits stored in the VBV buffer at any given time, then B will be computed as a smaller value $B_C$ by the buffer management software than the true value $B_T$. As video frames are processed, $B_T - B_C$ will grow in magnitude and thus pose a risk that eventually $B_C$ will be so small in comparison with $B_T$ that the buffer management software will erroneously attempt to extract more bits from the VBV buffer than is actually in the VBV buffer. In accordance with the MPEG-2 standards, such an erroneous attempt would cause a VBV buffer violation labeled as "buffer overflow."

Thus, there is a need to avoid buffer overflow during encoding and decoding of video frames of a video signal.

SUMMARY OF THE INVENTION

The present invention provides a method for computing an average bits/frame (BA) for frames extracted from a buffer used for video encoding and decoding, each said frame having a same number of fields, said BA equal to (BR+BR1/J1)/J2, said BR1, J1, and J2 each a positive integer, said BR a bit rate in bits/sec, said BR1/BR a positive integer, said method comprising:

determining BR1, J1, and J2 such that J2/(1+(BR1/BR)/J1) as evaluated in floating point is approximately equal to FR, said FR a frame rate in frames/sec;

calculating a quotient Q1 and remainder R1 from integer division of BR1 by J1;

calculating a quotient Q2 and remainder R2 from integer division of (BR+Q1) by J2;

initializing to zero accumulators A1 and A2; and executing N iterations, wherein N>1, and wherein executing each iteration includes:
 adding R1 to A1;
 if A1≧J1, then adding 1 to A2 and decrementing A1 by J1;
 setting BA=Q2 and adding R2 to A2;
 if A2≧J2, then adding 1 to BA and decrementing A2 by J2.

The present invention provides a computer code that computes an average bits/frame (BA) for frames extracted from a buffer used for video encoding and decoding, each said frame having a same number of fields, said BA equal to (BR+BR1/J1)/J2, said BR1, J1, and J2 each a positive integer, said BR a bit rate in bits/sec, said BR1/BR a positive integer, said computer code including an algorithm programmed to:

determine BR1, J1, and J2 such that J2/(1+(BR1/BR)/J1) as evaluated in floating point is approximately equal to FR, said FR a frame rate in frames/sec;

calculate a quotient Q1 and remainder R1 from integer division of BR1 by J1;

calculate a quotient Q2 and remainder R2 from integer division of (BR+Q1) by J2;

initialize to zero accumulators A1 and A2; and execute N iterations, wherein N>1, and wherein to execute each iteration includes:
 to add R1 to A1;
 if A1≧J1, then to add 1 to A2 and to decrement A1 by J1;
 to set BA=Q2 and to add R2 to A2; and
 if A2≧J2, then to add 1 to BA and to decrement A2 by J2.

The present invention provides a method of computing an average bits/frame (BA) for frames extracted from a buffer used for video encoding and decoding, each said frame having a variable number of fields, comprising:

defining BA1 as an average bits/frame for a two-field frame, said BA1 equal to (BR+BR1/J1)/J2, said BR1, J1, and J2 each a positive integer, said BR a bit rate in bits/sec, said BR1/BR a positive integer;

defining BA2 as an average bits/frame for a one-field frame, said BA2 equal to (BR+BR1/J1)/(2*J2);

determining BR1, J1, and J2 such that J2/(1+(BR1/BR)/J1) as evaluated in floating point is approximately equal to FR, said FR a frame rate in frames/sec;

calculating a quotient Q1 and remainder R1 from integer division BR1/J1;

calculating a quotient Q2 and remainder 9 from integer division (BR+Q1)/J2;

calculating a quotient Q3 and remainder R3 from integer division (BR+Q1)/(2*J2);

initializing to zero accumulators A1, A2, B1, and B2;

executing N iterations, wherein N>1, said executing iteration n of N relating to extracting a frame n from the buffer, said executing of iteration n including:
  calculating BA1, including:
    adding R1 to A1;
    if A1≧J1 then adding 1 to A2 and decrementing A1 by J1;
    setting BA1=Q2 and adding R2 to A2;
    if A2≧J2, then adding 1 to BA1 and decrementing A2 by J2;
  determining a number of fields $F_n$ comprised by the frame n;
  if $F_n$ is even then setting BA2=0 else calculating BA2 including:
    adding R1 to B1;
    if B1≧J1, then adding 1 to B2 and decrementing B1 by J1;
    setting BA2=Q3 and adding R3 to B2;
    if B2≧(2*J2), then adding 1 to BA2 and decrementing B2 by (2*J2);
  computing BA=$(F_n/2)$*BA1+BA2, said $(F_n/2)$ computed by integer division.

The present invention provides a computer code that computes an average bits/frame (BA) for frames extracted from a buffer used for video encoding and decoding, each said frame having a variable number of fields, said BA a function of BA1 and BA2, said BA1 defined as an average bits/frame for a two-field frame, said BA1 equal to (BR+BR1/J1)/J2, said BR1, J1, and J2 each a positive integer, said BR a bit rate in bits/sec, said BR1/BR a positive integer, said BA2 defined as an average bits/frame for a one-field frame, said BA2 equal to (BR+BR1/J1)/(2*J2), said computer code including an algorithm, said algorithm programmed to:

determine BR1, J1, and J2 such that J2/(1+(BR1/BR)/J1) as evaluated in floating point is approximately equal to FR, said FR a frame rate in frames/sec;

calculate a quotient Q1 and remainder R1 from integer division BR1/J1;

calculate a quotient Q2 and remainder R2 from integer division (BR+Q1)/J2;

calculate a quotient Q3 and remainder R3 from integer division (BR+Q1)/(2*J2);

initialize to zero accumulators A1, A2, B1, and B2;

execute N iterations, wherein N>1, said iteration n of N relating to extracting a frame n from the buffer, wherein to execute iteration n includes:
  to calculate BA1, including:
    to add R1 to A1;
    if A1≧J1 then to add 1 to A2 and to decrement A1 by J1;
    to set BA1=Q2 and to add R2 to A2;
    if A2≧J2, then to add 1 to BA1 and to decrement A2 by J2;
  to determine a number of fields $F_n$ comprised by the frame n;
  if $F_n$ is even then to set BA2=0 else to calculate BA2 including:
    to add R1 to B1;
    if B1≧J1, then to add 1 to B2 and to decrement B1 by J1;
    to set BA2=Q3 and to add R3 to B2;
  to compute BA=$(F_n/2)$*BA1+BA2, said $(F_n/2)$ computed by integer division.

The present invention provides a method for computing Z, said Z=$\Sigma_n Z_n$, said $\Sigma_n$ denoting a summation over n from 1 to N, said N a positive integer of at least 1, said $Z_n = X_n/Y$, said $X_n = (I_{1n}/J_1)M_{1n} + (I_{2n}/J_2)M_{2n} + \ldots + (I_{Kn}/J_K)M_{Kn}$, said Y and said $I_{kn}$, $J_k$, $M_{kn}$ (k=1, 2, ..., K) each a positive integer, said K a positive integer of at least 1, said method comprising:

setting Z=0, B=0, and $A_k$=0 for k=1, 2, ..., K;

executing N iterations, said executing of iteration n of N including:
  calculating a quotient $Q_{kn}$ and a remainder $R_{kn}$ from integer division $I_{kn}/J_k$ for k=1, 2, ..., K;
  calculating $X_n = \Sigma_k [Q_{kn} M_{kn}]$ as summed over k from 1 to K;
  adding $R_{kn} M_{kn}$ to $A_k$ for k=1, 2, ..., K;
  for k=1, 2, ..., K, if $A_k \geq J_k$, then adding 1 to B and decrementing $A_k$ by $J_k$;
  if Y≠1 then calculating a quotient $Q_n$ and a remainder $R_n$ from integer division $X_n/Y$, else setting $Q_n = X_n$ and $R_n$=0;
  setting $Z_n = Q_n$ and adding $R_n$ to B;
  if B≧Y, then calculating $Z_n = Z_n + 1$ and decrementing B by Y;
  adding $Z_n$ to Z.

The present invention provides a computer code that computes Z, said Z=$\Sigma_n Z_n$, said $\Sigma_n$ denoting a summation over n from 1 to N, said N a positive integer of at least 1, said $Z_n = X_n/Y$, said $X_n = (I_{1n}/J_1)M_{1n} + (I_{2n}/J_2)M_{2n} + \ldots + (I_{Kn}/J_K)M_{Kn}$, said Y and said $I_{kn}$, $J_k$, $M_{kn}$, (k=1, 2, ..., K) each a positive integer, said K a positive integer of at least 1, said computer code including an algorithm, said algorithm programmed to:

set Z=0, B=0, and $A_k$=0 for k=1, 2, ..., K;

execute N iterations, wherein to execute iteration n of N includes:
  to calculate a quotient $Q_{kn}$, and a remainder $R_{kn}$ from integer division $I_{kn}/J_k$ for k=1, 2, ..., K;
  to calculate $X_n = \Sigma_k [Q_{kn} M_{kn}]$ as summed over k from 1 to K;
  to add $R_{kn} M_{kn}$ to $A_k$ for k=1, 2, ..., K;
  for k=1, 2, ..., K, if $A_k \geq J_k$, then to add 1 to B and to decrement $A_k$ by $J_k$;
  if Y≠1 then to calculate a quotient $Q_n$ and a remainder $R_n$ from integer division $X_n/Y$, else to set $Q_n = X_n$ and $R_n$=0;
  to set $Z_n = Q_n$ and to add $R_n$ to B;
  if B≧Y then to calculate $Z_n = Z_n + 1$ and to decrement B by Y;
  to add $Z_n$ to Z.

The present invention avoids buffer overflow during encoding and decoding of video frames of a video signal.

DETAILED DESCRIPTION OF THE INVENTION

Video compression under MPEG-2 includes three types of compression: spatial compression, temporal compression, and 3/2 compression. Spatial compression compresses data within a picture such as by use of discrete cosine transformation (DCT) coefficients to account for spatial redundancy within the picture. Temporal compression compresses data between successive pictures such as through motion compensation (e.g., describing a picture in terms of vectors that relate portions of the picture to corresponding portions of the previous picture). 3/2 compression compresses 1½ pictures into 1 picture as will be explained as follows.

Under MPEG-2, there is a distinction between pictures, fields, and frames. A picture comprises a physical screen of binary bits. Under MPEG-2, a picture consists of two interlacing fields, namely an upper field that includes bits on an upper portion of the picture and a lower field that includes bits on a lower portion of the picture. Each such field may be thought of as a half-picture. A frame is collection of fields that is stored in a Video Buffering Verifier (VBV) buffer as a unit. Under MPEG-2, a frame has either 2 fields or 3 fields and is called a 2-field frame or a 3-field frame, respectively. An example of a 2-field frame is the upper and lower fields of a single picture. An example of a 3-field frame is the upper and lower fields of a first picture followed by the upper field of a second (i.e., next) picture. With a 3-field frame having fields sequentially denoted as fields 1, 2, and 3, the field 3 may be indistinguishable to a human eye from the field 1. Thus with the previous example of a 3-field frame, the upper field of the second picture is indistinguishable to the human eye from the upper field of the first picture. Accordingly, field 3 of the 3-field frame is represented by a "repeat flag" that denotes repetition of the bits of field 1. Since the 3-field frame includes only 2 fields of bits and the repeat flag, the 3-field frame represents a compression known as the "3/2 compression."

Figure 1:
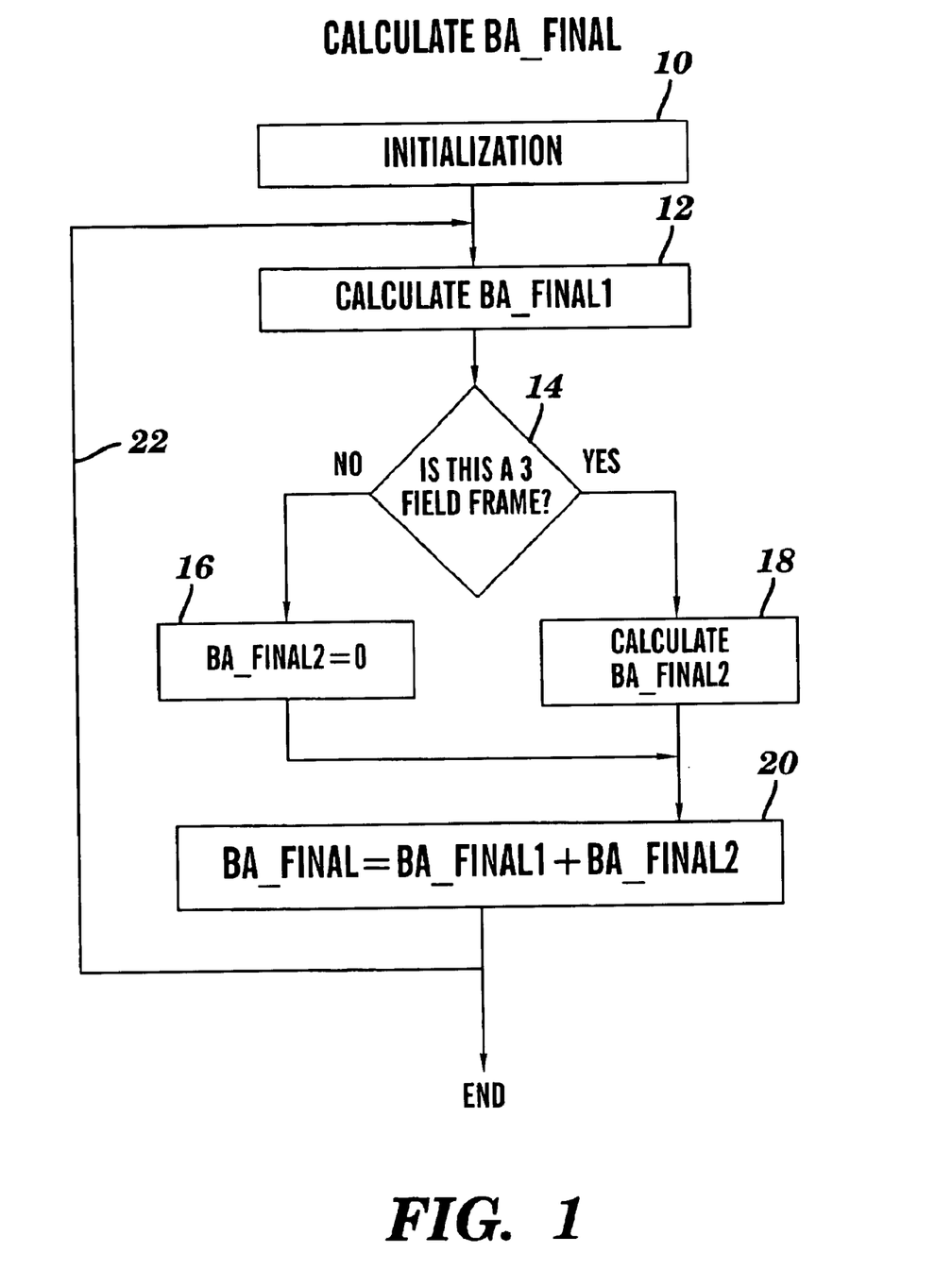
FIG. 1 is a flow chart showing an iterative calculation of extracted bits/frame (BA_FINAL) of video processing in terms of a single-picture bits/frame (BA₁₃ FINAL1) and half-picture bits/frame single-picture bits/frame (BA_FINAL2), in accordance with embodiments of the present invention.
Figure 2:
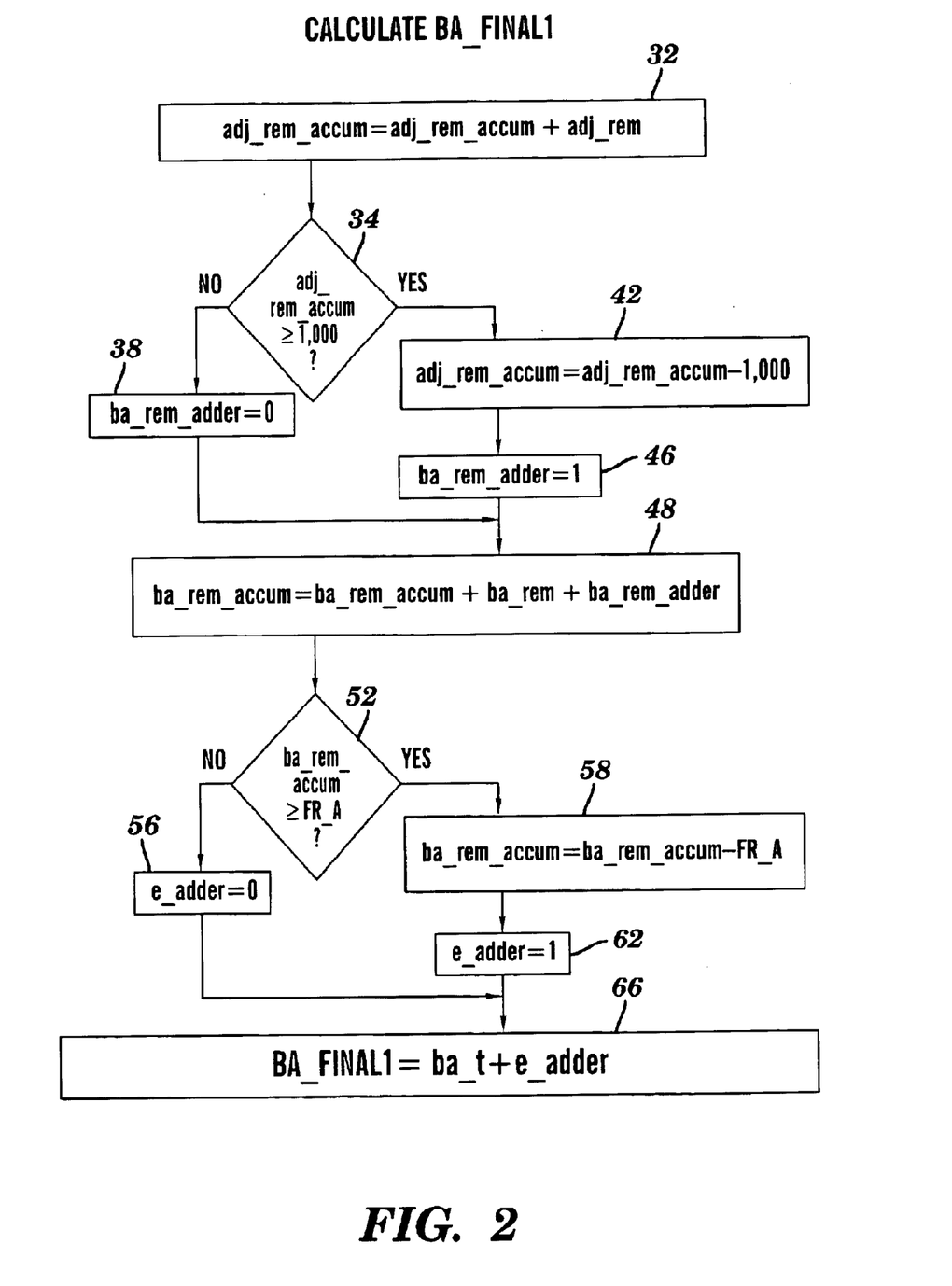
FIG. 2 is a flow chart for calculation of the single-picture bits/frame (BA_FINAL1) of FIG. 1, in accordance with embodiments of the present invention.
Figure 3:
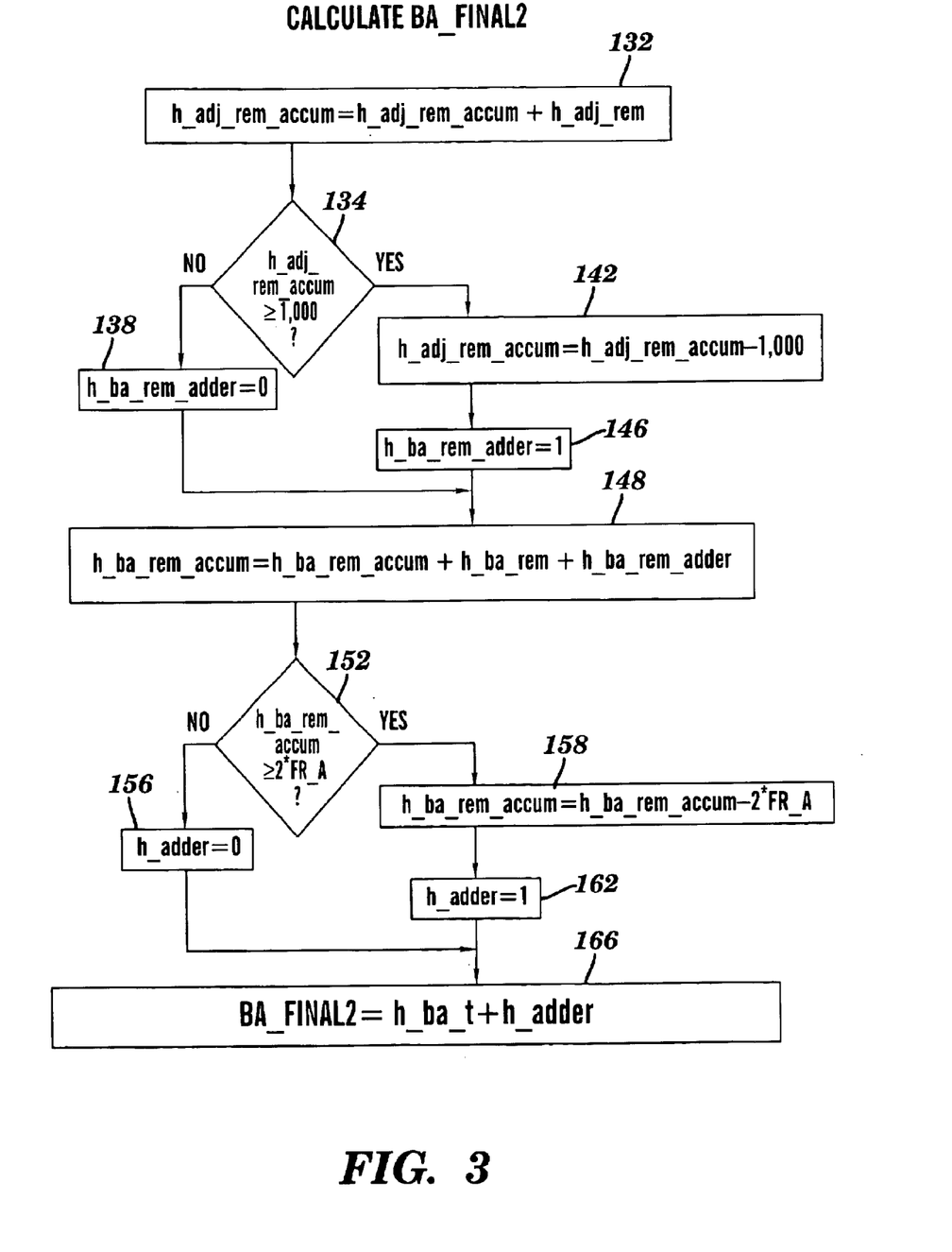
FIG. 3 is a flow chart for calculation of the half-picture bits/frame (BA_FINAL2) of FIG. 1, in accordance with embodiments of the present invention.

During video processing of the VBV buffer for subsequent decoding, BA bits/frame are removed from the VBV buffer. Each such removal of BA bits from the VBV buffer constitutes an "iteration" in a sequence of such removals. Upon such removal in an iteration, the buffer management software must compute BA corresponding to the average number of bits/frame removed and keep track of the number of bits present in the VBV buffer at the end of each iteration. Equation (4) may be viewed as a calculation for BA corresponding to a 2-field frame of a single picture. Thus if a 2-field frame is processed during an iteration, then Equation (4) may be used for calculating BA. But if a 3-field frame is processed during an iteration, then BA corresponding to 3 fields, or 1½ pictures, must be calculated. Thus a 3-field frame value of BA is equal to BA of a single picture+half-BA of a single picture, which represents BA for 1½ pictures. Accordingly, calculation of BA for a given iteration depends on whether the frame of extracted bits for the iteration is a 2-field frame or a 3-field frame, as depicted in FIGS. 1–3, in accordance with embodiments of the present invention. FIGS. 1–3 are based on Equation (4) with modifications in accordance with the present invention.

FIG. 1 is a flow chart illustrating looping through iterations. In each iteration, the total bits/frame (BA_FINAL) is calculated to represent the average number of bits/frame that is extracted from the buffer in each iteration. As seen in block 20, BA_FINAL is a sum of terms BA_FINAL1 and BA_FINAL2. The term BA_FINAL1 represents BA for a 2-fields (i.e., full picture) and is calculated as shown in FIG. 2. The term BA_FINAL2 represents BA for a 1-field frame (i.e., half-picture) and is calculated as shown in FIG. 3. For a 2-field frame, BA_FINAL2=0 and BA_FINAL=BA_FINAL1. For a 3-field frame, BA_FINAL is a sum of BA for one picture (i.e., BA_FINAL1) and BA for a half-picture (i.e., BA_FINAL2), which in composite represents 1½ pictures.

Block 10 of FIG. 1 includes initializations for the BA_FINAL1 calculations of FIG. 2 and initializations for the BA_FINAL2 calculations of FIG. 3. The initialization block 10 will be described infra in conjunction with FIGS. 2 and 3. Blocks 12, 14/16 or 14/18, and 20 are executed within a single iteration. Thus, the blocks 12, 14/16 or 14/18, and 20, together with a return path 22, defines an iteration loop. Block 12 calculates BA_FINAL1 as described in FIG. 2. Decision block 14 asks whether the frame being processed for extraction is a 3-field frame. If NO, then BA_FINAL2 is set equal to 0 (for a 2-field frame) as shown in block 16. If YES, then block 18 is executed, and block 18 calculates BA_FINAL2 (for a 3-field frame) as described in FIG. 3. Block 20 sums BA_FINAL1 and BA_FINAL2 to calculate BA_FINAL for either a 2-field frame or a 3-field frame. The path 22 effectuates a transition between successive iterations.

The flow chart of FIG. 1 may be modified in any manner that is logically equivalent to FIG. 1 as shown herein, as would be understood by one of ordinary skill in the art. For example, blocks 16 and 18 could be replaced by the following logic. If NO is the answer to the query in decision block 14, then BA_FINAL=BA_FINAL1 is executed. If YES is the answer to the query in decision block 14, then BA_FINAL2 is calculated followed by execution of BA_FINAL =BA_FINAL1+BA_FINAL2.

FIG. 2 is a flow chart for calculation of BA_FINAL1 of the block 12 of FIG. 1. Thus the flow chart of FIG. 2 is within the iterations loop shown in FIG. 1. In FIG. 2, BA_FINAL1 is calculated, as shown in FIG. 2, as a function of BA1:

$$BA1=(BR+BR/1000)/FR\_A \qquad (5)$$

wherein BR is bit rate in bits/second expressed as a positive integer, wherein FR_A is a frame rate in frames/sec (e.g., frames/sec), and wherein the divisions by 1000 and FR_A are integer divisions with truncation of fractional remainders. It is assumed herein that "integer division" generally results in truncation of fractional remainders.

The initialization 10 of FIG. 1 comprises the following initializations for the BA_FINAL1 calculation of FIG. 2:

$$adj\_t = BR/1000 \quad (6)$$

$$adt\_rem = BR - (1000 * adj\_t) \quad (7)$$

$$ba\_t = (BR + adj\_t)/FR\_A \quad (8)$$

$$ba\_rem = (BR + adj\_t) - (FR\_A * ba\_t) \quad (9)$$

$$adj\_rem\_accum = 0 \quad (10)$$

$$ba\_rem\_accum = 0 \quad (11)$$

wherein the divisions by 1000 and FR_A in Equations (6) and (8), respectively, are by integer division with truncation. For example, if BR=26320, BA1 would equal 878.21 in a floating point implementation of Equation (5). With integer division, however, the initializations of Equations (6)–(9) yield:

$$adj\_t = 26$$

$$adj\_rem = 320$$

$$ba\_t = 878$$

$$ba\_rem = 6$$

Note that ba_t in Equation (8) is the truncated value of BA1 of Equation (5), as illustrated in the preceding example such that the ba_t=878 and BA1 (floating point)=878.21. As shown in the block 66 of FIG. 2, BA_FINAL1 is equal to ba_t unless a parameter e_adder is equal to 1. The parameter e_adder offsets the aforementioned truncation as will now be demonstrated.

The remainders adj_rem and ba_rem are lost through truncation resulting from integer division in Equations (6) and (8), respectively. To compensate for this truncation, the algorithm of FIG. 2 saves and accumulates remainders adj_rem and ba_rem in accumulators adj_rem_accum and ba_rem_accum, respectively, in each iteration of FIG. 1, as shown in blocks 32 and 48, respectively, of FIG. 2. An "accumulator" is defined herein as a storage location for storing a cumulative quantity (i.e., a summation). If in an iteration of FIG. 1, ba_rem_accum accumulates to FR_A (e.g. 30) or greater, then the accumulator ba_rem_accum is decremented by FR_A and BA_FINAL1 is incremented by 1 (i.e., e_adder=1 in FIG. 2), as shown in blocks 52, 58, and 62. If ba_rem_accum is less than FR_A, then e_adder is set to zero (see blocks 52 and 56) and BA_FINAL1 is not incremented by 1. Similarly, if in an iteration of FIG. 1, adj_rem_accum in FIG. 2 accumulates to 1000 or greater, then the accumulator adj_rem_accum is decremented by 1000 and the accumulator ba_rem_accum is incremented by 1 (i.e., ba_rem_adder=1 in FIG. 2), as shown in blocks 34, 42, and 46. If adj_rem_accum is less than 1000 in an iteration, then ba_rem_adder is set to zero (see blocks 34 and 38) and ba_rem_accum is not incremented by 1. It should be noted from block 48 that ba_rem_adder is an increment to the accumulator ba_rem_accum. Thus the accumulators adj_rem_accum and ba_rem_accum compensate for the truncation losses in computing BA1 of Equation (5) by integer division of 1000 and FR_A, respectively.

The flow chart of FIG. 2 may be modified in any manner that is logically equivalent to FIG. 2 as shown herein, as would be understood by one of ordinary skill in the art. For example, some or all of the intitializations of Equations (6)–(9), or mathematical equivalents thereof, could alternatively be performed within the iteration loop of FIG. 2. Since adj_rem_accum and ba_rem_accum are variables rather than constants, Equations (10) and (11) (or mathematical equivalents thereof) could each alternatively be performed within the iteration loop of FIG. 2 but only at the beginning of the first iteration.

Figure 4:
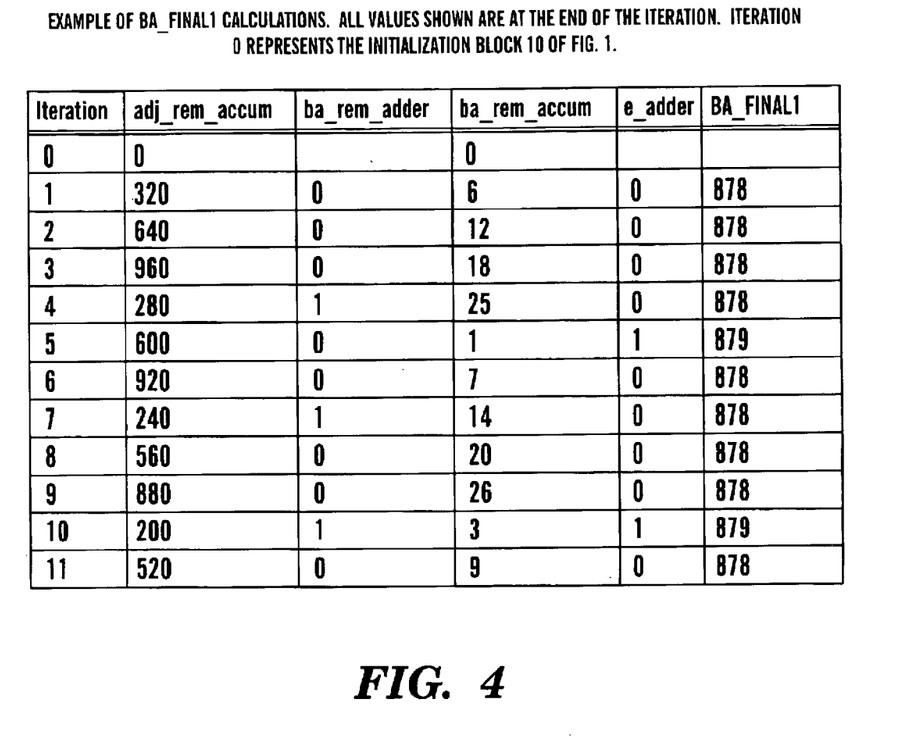
FIG. 4 is a table illustrating iterations of FIG. 1 for the BA_FINAL1 calculation of FIG. 2 for an example, in accordance with embodiments of the present invention.

FIG. 4 illustrates for the previous example (i.e., BR=26320) values at the end of each of the first 11 iterations of: adj_rem_accum, ba_rem_adder, ba_rem_accum, e_adder, and BA_FINAL1. In FIG. 4, BA_FINAL1 has the truncated value of 878 at the end of iterations 1–4, 6–9, and 11, but has a value of 879 in iterations 5 and 10. Hence, the algorithm of FIG. 2 mathematically extracts an extra bit in iterations 5 and 10 to compensate for the truncations in iterations 1–4 and 6–9. Thus, the algorithm of FIG. 2 prevents propagation of the truncation error by periodically simulating the effect of near-perfect integer division.

FIG. 3 is a flow chart for calculation of BA_FINAL2 of the block 18 of FIG. 1. Thus the flow chart of FIG. 3 is within the iterations loop shown in FIG. 1. In FIG. 3, BA_FINAL2 is calculated, as shown in FIG. 3, as a function of BA2:

$$BA2 = (BR + BR/1000)/(2 * FR\_A) \quad (12)$$

wherein the divisions by 1000 and 2*FR_A are integer divisions with truncation of fractional remainders.

The initialization 10 of FIG. 1 comprises, in addition to initializations of Equations (6)–(11), the following initializations for the BA_FINAL2 calculation of FIG. 3:

$$h\_adj\_t = BR/1000 \quad (13)$$

$$h\_adj\_rem = BR - (1000 * h\_adj\_t) \quad (14)$$

$$h\_ba\_t = (BR + h\_adj\_t)/(2 * FR\_A) \quad (15)$$

$$h\_ba\_rem = (BR + h\_adj\_t) - (2 * FR\_{i\_A} * h\_ba\_t) \quad (16)$$

$$h\_adj\_rem\_accum = 0 \quad (17)$$

$$h\_ba\_rem\_accum = 0 \quad (18)$$

wherein the divisions by 1000 and 2*FR_A in Equations (13) and (15), respectively, are by integer division with truncation. Note that h_adj_t and h_adj_rem of FIG. 3 are equal to adj_t and adj_rem of FIG. 2. For the preceding example with BR=26320, BA2 would equal 439.105 in a floating point implementation of Equation (12). With integer division, however, the initializations of Equations (13)–(14) yield:

$$h\_adj\_t = 26$$

$$h\_adj\_rem = 320$$

$$h\_ba\_t = 439$$

$$h\_ba\_rem = 6$$

Note that h_ba_t in Equation (15) is the truncated value of BA2 of Equation (12), as illustrated in the preceding example such that the h_ba_t=439 and BA2 (floating point)=439.105. Accordingly, BA_FINAL2 is equal to h_ba_t unless a parameter h_adder is equal to 1, as shown in the block 166 of FIG. 3. The parameter h_adder offsets the aforementioned truncation as will now be demonstrated.

The remainders h_adj_rem and h_ba_rem are lost through truncation resulting from integer division in Equations (13) and (15), respectively. To compensate for this truncation, the algorithm of FIG. 3 saves and accumulates remainders h_adj_rem and h_ba_rem in accumulators h_adj_rem_accum and h_ba_rem_accum, respectively, in each "YES" iteration of FIG. 1 (i.e., an iteration in which the answer to the question in the decision block 14 of FIG. 1 is "YES"), as shown in blocks 132 and 148, respectively, of FIG. 3. If in such a "YES" iteration of FIG. 1, h_ba_rem_accum accumulates to 2*FR_A (i.e. 60) or greater, then the accumulator h_ba_rem_accum is decremented by 2*FR_A and BA_FINAL2 is incremented by 1 (i.e., h_adder=1 in FIG. 3), as shown in blocks 152, 158, and 162. If h_ba_rem_accum is less than 2*FR_A, then h_adder is set to zero (see blocks 152 and 156) and BA_FINAL2 is not incremented by 1. Similarly, if in such a "YES" iteration of FIG. 1, h_adj_rem_accum in FIG. 3 accumulates to 1000 or greater, then the accumulator h_adj_rem accum is decremented by 1000 and the accumulator h_ba_rem_accum is incremented by 1 (i.e., h_ba_rem$_{13}$ adder=1 in FIG. 3), as shown in blocks 134, 142, and 146. If h_adj_rem_accum is less than 1000 in an iteration, then h_ba_rem_adder is set to zero (see blocks 134 and 138) and h_ba_rem_accum is not incremented by 1. It should be noted from block 148 that h_ba_rem_adder is an increment to the accumulator h_ba_rem_accum. Thus the accumulators h_adj_rem_accum and h_ba_rem_accum compensate for the truncation losses in computing BA2 of Equation (12) by integer division of 1000 and 2*FR_A, respectively.

The flow chart of FIG. 3 may be modified in any manner that is logically equivalent to FIG. 3 as shown herein, as would be understood by one of ordinary skill in the art. For example, some or all of the intitializations of Equations (13)–(16), or mathematical equivalents thereof, could alternatively be performed within the iteration loop of FIG. 3. Since h_adj_rem_accum and h_ba_rem_accum are variables rather than constants, Equations (17) and (18) (or mathematical equivalents thereof) could each alternatively be performed within the iteration loop of FIG. 3 but only at the beginning of the first iteration.

Figure 5:
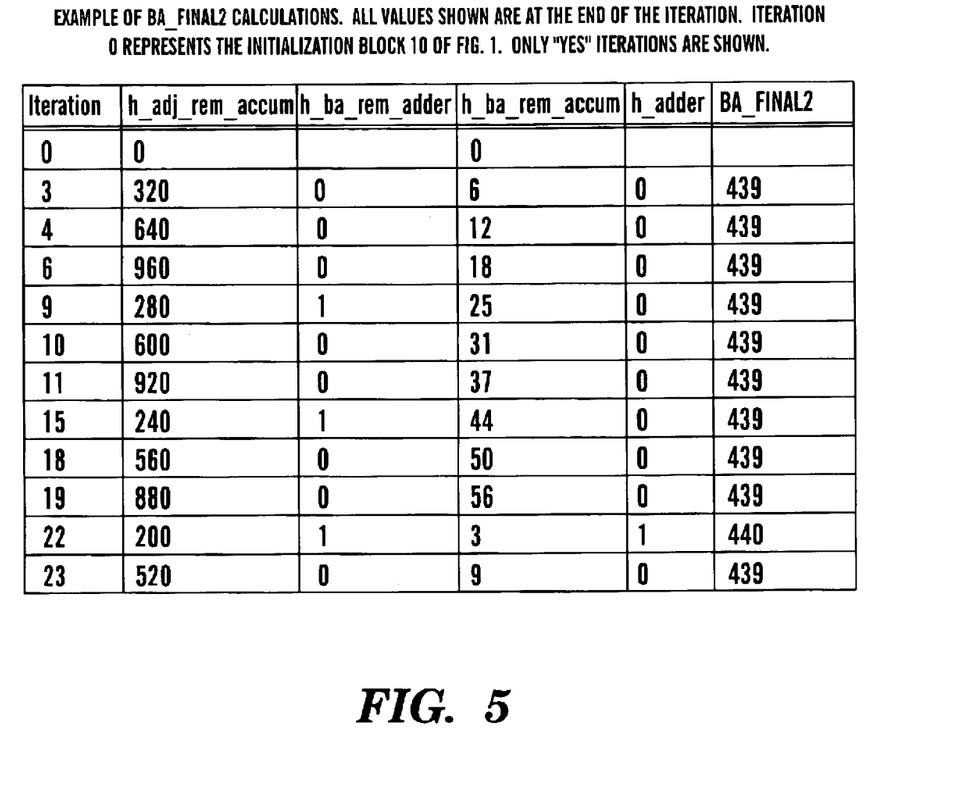
FIG. 5 is a table illustrating iterations of FIG. 1 for the BA_FINAL2 calculation of FIG. 3 for an example, in accordance with embodiments of the present invention.

FIG. 5 illustrates for the previous example (i.e., BR=26320) values at the end of each of "YES" iterations (i.e., iterations 3, 4, 6, 9–11, 15, 18–19, and 22–23) of: h_adj_rem_accum, h_ba_rem_adder, h_ba_rem$_{13}$ accum, h_adder, and BA_FINAL2. In FIG. 5, BA_FINAL2 has the truncated value of 439 at the end of iterations 3, 4, 6, 9–11, 15, 18–19, and 23, but has a value of 440 in iteration 22. Hence, the algorithm of FIG. 3 mathematically extracts an extra bit in iteration 22 to compensate for the truncations in iterations 3, 4, 6, 9–11, 15, and 18–19. Thus, the algorithm of FIG. 3 prevents propagation of the truncation error by periodically simulating the effect of near-perfect integer division.

While FIG. 1 implements 3/2 compression based on video encoding of either 2 fields/frame or 3 fields/frame, the scope of the present invention includes a more general F/2 compression, wherein F is the number of fields per frame such that F≧3. With F/2 compression, the question in decision box 14 of FIG. 1 is replaced by the following question: "Does this frame have F fields, wherein F≧3?" Block 18 calculates BA_FINAL2 only if F is odd. Block 20 is changed to:

$$BA\_FINAL=(F/2)BA\_FINAL1+BA\_FINAL2 \text{ (if } F \text{ is odd)}$$

$$BA\_FINAL=(F/2)BA\_FINAL1 \text{(if } F \text{ is even)}$$

wherein (F/2) is performed by integer division with truncation. For example, if F=3, which defines 3/2 compression, F/2=1 in integer division so that BA_FINAL=BA_FINAL1+BA_FINAL2 as shown in block 20 of FIG. 1. As another example, if F=4, which defines 4/2 compression, F/2=2 in integer division so that BA_FINAL=2*BA_FINAL1. While MPEG-2 currently limits F to 3, the present invention envisions inevitable advances in technology having improved compression such that F>3.

Equation (4) can be cast into a first different form by considering an example of FR=29.98 frames/sec in Equation (1). Using the same methodology that derived Equation (4), the following equation is derived:

$$BA=(BR+(2*BR)/3000)/30 \quad (19)$$

Equation (4) can be cast into a second different form by considering an example of FR=29.94 frames/sec in Equation (1). Using the same methodology that derived Equation (4), the following equation is derived:

$$BA=(BR+BR/500)/30 \quad (20)$$

Equation (4) can be cast into a third different form by considering an example of FR=19.97 frames/sec in Equation (1). Using the same methodology that derived Equation (4), the following equation is derived:

$$BA=(BR+(3*BR)/2000)/20 \quad (21)$$

Equations (4), (12), and (19)–(20) may be considered special cases of the following more general form:

$$BA=(BR+BR1/J1)/J2 \quad (22)$$

wherein positive integers BR1, J1, and J2 are determined such that J2/(1+(BR1/BR)/J1) as evaluated in floating point is approximately equal to FR, and wherein BR1/BR is a positive integer. BR1, J1, and J2 may be so determined by, inter alia: being calculated, being received as input, or by being hard-coded within an algorithm that implements Equation (22). Equations (4), (12), and (19)–(21) have the following common features: BR1/BR is a positive integer, J1 is a multiple of 10, and J1>J2. BA as computed from Equation (22) is "approximately equal" to BR/FR (see Equation (1) for FR), which means that BA as computed from Equation (22) equals BR/FR to an extent that terms of second or higher order in α (i.e., the terms α², α³, . . . ) are negligible in comparison with linear terms in α in the Taylor series for $(1-\alpha)^{-1}$ wherein α=(BR1/BR)/J1, as illustrated for α=1/1000 in the derivation of Equation (4) from Equation (1). Note that α=2/3000, 1/500, and 3/2000 in Equations (19), (20), and (21), respectively. Similarly, J2/(1+(BR1/BR)/J1) is "approximately equal" to FR. For a given FR and BR, there may be more than one combination of BR1, J1, and J2 such that J2/(1+(BR1/BR)/J1) is "approximately equal" to FR.

Figure 6:
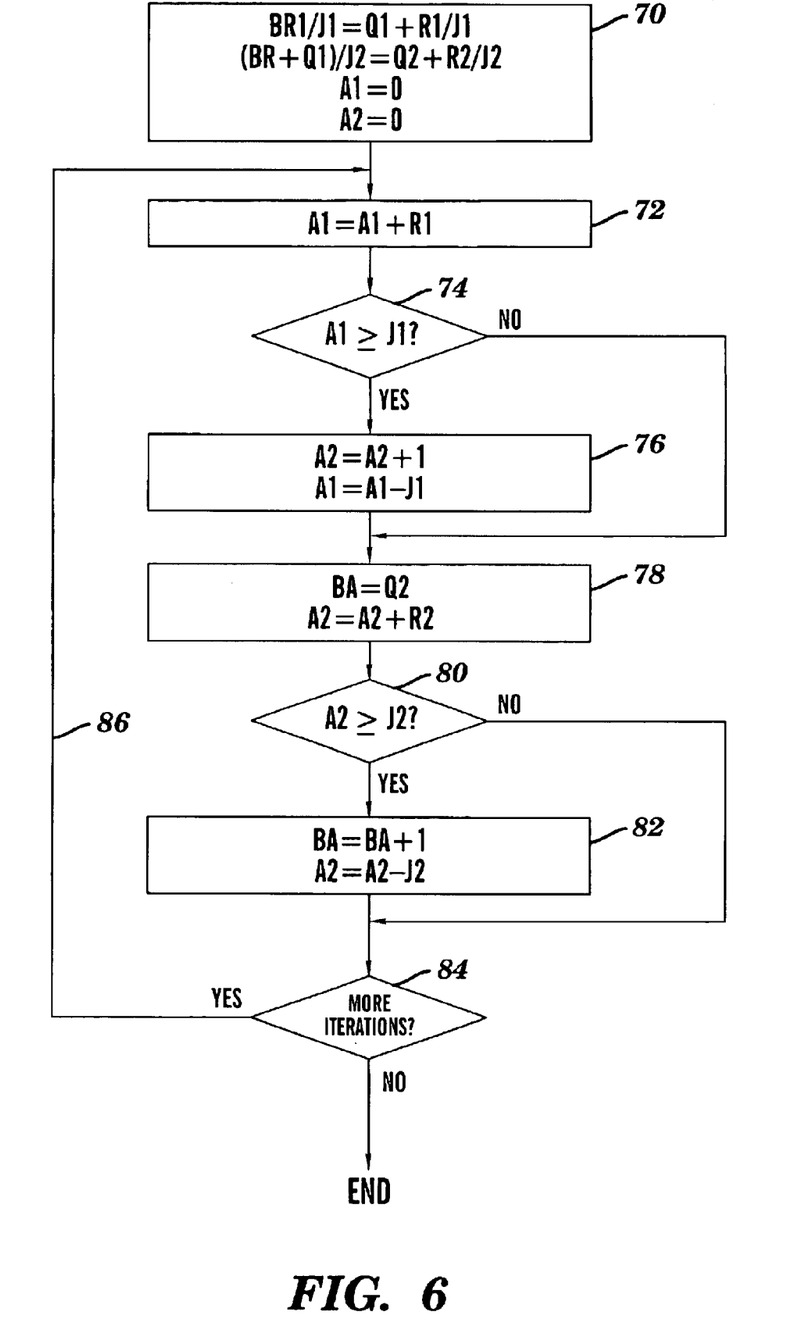
FIG. 6 is a flow chart for an iterative calculation with integer division, in accordance with embodiments of the present invention.

Equation (22) is implemented as shown in the flow chart of FIG. 6, in accordance with embodiments of the present invention. The following initializations occur in block 70 of FIG. 6:

a quotient Q1 and a remainder R1 are calculated from integer division of BR1 by J1;

a quotient Q2 and a remainder R2 are calculated from integer division of (BR+Q1) by J2;

and a first accumulator A1 and a second accumulator A2 are each initialized to zero.

Following the aforementioned initializations, N iterations are executed, wherein N>1. Each iteration includes blocks 72, 74, 76, 78, 80, 82, and 84, and return path 86. Block 84 executes a test that determines whether any more iterations remain to be executed. Executing each iteration includes:

adding R1 to A1 (block 72);

if A1≧J1 then adding 1 to A2 and decrementing A1 by J1 (blocks 74 and 76);

calculating BA as equal to Q2 (block 78);

adding R2 to A2 (block 78); and if A2≧J2 then adding 1 to BA and and decrementing A2 by J2 (blocks 80 and 82).

Since Equation (22) encompasses Equations (5) and (12) as special cases, Equation (22) and the flow chart and algorithm of FIG. 6 could be used to implement the calculations of BA_FINAL1 and BA_FINAL2 of FIG. 2 and FIG. 3, respectively. Equivalently, Equation (22) and the flow chart and algorithm of FIG. 6 could be used to implement calculations of bits/frame (BA1) for two fields per frame (e.g., Equation (5)) and calculations of bits/frame (BA2) for one field per frame (e.g., Equation (6)). For calculating BA1=BA in Equation (22), the positive integers BR1, J1, and J2 are determined such that J2/(1+(BR1/BR)/J1) as evaluated in floating point is approximately equal to FR. For calculating BA2=BA in Equation (22) in a manner that is consistent with calculating BA1, J1 is replaced by 2*J1.

The flow chart of FIG. 6 may be modified in any manner that is logically equivalent to FIG. 6 as shown herein, as would be understood by one of ordinary skill in the art. For example, some or all of the intitializations block 70, or mathematical equivalents thereof, could alternatively be performed within the iteration loop of FIG. 6. Since accumulators A1 and A2 are variables rather than constants, initializations of A1=0 and A2=0 (or mathematical equivalents thereof) could each alternatively be performed within the iteration loop of FIG. 6 but only at the beginning of the first iteration.

Equations (5) and (12), as well as Equation (22), which are computed with integer division by the algorithms described by FIGS. 1–3 and 6, may be expressed in a more general form as follows, in accordance with the present invention:

$$Z_n = X_n/Y \qquad (23)$$

$$X_n = (I_{1n}/J_1)M_{1n} + (I_{2n}/J_2)M_{2n} + \ldots + (I_{Kn}/J_K)M_{Kn} \qquad (24)$$

where "n" is an iteration index defining iterations analogous to the iterations described supra for FIG. 1 and FIG. 6. $I_{kn}$, $J_k$, and $M_{kn}$ (k=1, 2, ..., K; K≧1) are positive integers, and $I_{kn}/J_k$ is performed by integer division with truncation. $X_n$ and Y are positive integers and $X_n/Y$ is performed by integer division with truncation. Additionally, Y and $J_k$ (k=1, 2, ..., K) cannot be zero. As indicated in Equations (23)–(24), $I_{kn}$ and $M_{kn}$ (k=1, 2, ..., K) are permitted to vary with iteration index n. Y and $J_k$ (k=1, 2, ..., K) are assumed to be constant and thus do not vary with iteration index n. $Z_n$ varies with iteration index n even if $I_{kn}$ and $I_{kn}$ do not vary with iteration index n, because the use of accumulators in accordance with the present invention causes $Z_n$ to increase at selected iterations in order to prevent propagation of error.

The present invention could also be used to calculate the following summation:

$$Z = \Sigma_n Z_n \qquad (25)$$

wherein the summation over n in Equation (25) is from 1 to N, and wherein N is the total number of iterations.

Equations (23)–(24) reduce to Equation (5) if Y=FR_A, K=2, $I_{1n}$=BR, $J_1$=1, $M_{1n}$=1, $I_{2n}$=BR, $J_2$=1000, and $M_{2n}$=1. Note that 3/2 compression, or more generally F/2 compression described supra, could be modeled in Equations (23)–(24) by having $M_{kn}$=0 for those iterations in which the frame being processed has 2 fields, and $M_{kn}$=1 for those iterations in which the frame being processed has 3 fields, and suitable choices for Y, $I_k$, $J_k$, and $M_k$. For example, 3/2 compression, in combination with 2/2 compression, could be placed in the form of $$BA_n = [BR + BR/1000 + (BR/2)*J_n + (BR/2000)*J_n]/FR\_A$$

or $$BA_n = [2*BR + BR/500 + BR*J_n + (BR/1000)*J_n]/(2*FR\_A)$$

such that $J_n$=0 for iterations n having 2 fields/frame, and $J_n$=1 for iterations n having 3 fields/frame. Note that the preceding equations for $BA_n$ conform to the form of Equations (23)–(24).

Relative to FIGS. 1–3 and 6, and accompanying equations and text pertaining thereto as described supra, BR and FR may each be predetermined or received as input.

Figure 7:
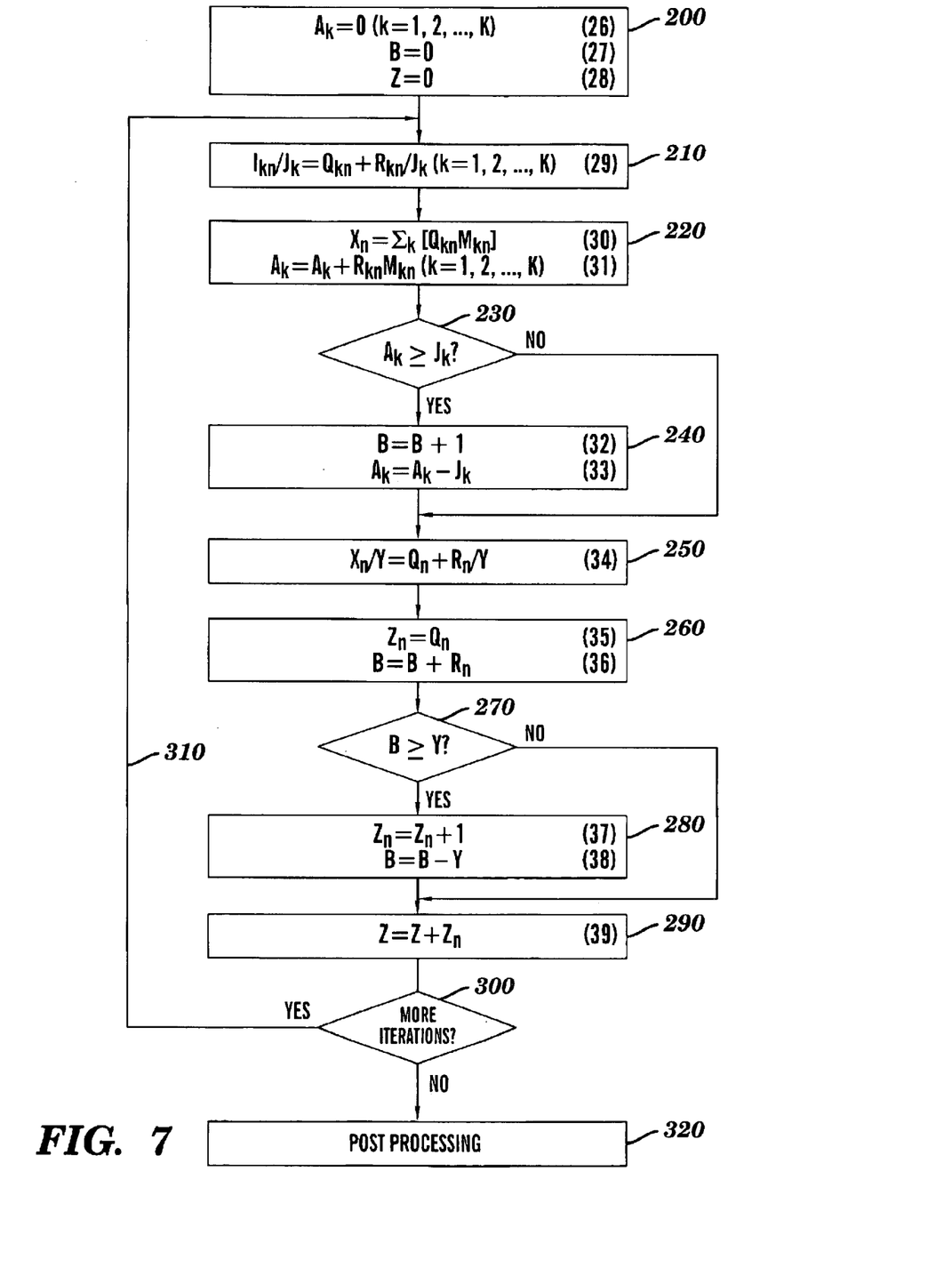
FIG. 7 is a flow chart for an iterative summation calculation with integer division, in accordance with embodiments of the present invention.

The present invention computes $Z_n$ in Equations (23)–(24) as described by FIG. 7. An accumulator B accumulates remainders resulting from integer division by Y in Equation (23). Accumulators $A_1$, $A_2$, ..., $A_K$ accumulate remainders resulting from integer division by $J_1$, $J_2$, ..., $J_K$, respectively, in Equation (24). Block 200 in FIG. 7 initializes to zero the accumulators B and $A_k$ (k=1, 2, ..., K) as well as the summation Z defined in Equation (25), as shown in Equations (23)–(24). Looping begins at block 210, and each loop iteration n includes blocks 210, 220, 230, 240, 250, 260, 270, 280, 290, 300, and return path 310. As described by Equation (29), block 210 calculates $I_{kn}/J_k$ by integer division to yield an integer quotient $Q_{kn}$ and an integer remainder $R_{kn}$ such that $R_{kn} < J_k$ for k=1, 2, ..., K. In block 220 as described by Equation (30), $X_k$ is computed by the summation $\Sigma_k$, from k=1 to k=K, of $Q_{kn}M_{kn}$. Also in block 220, Equation (31) updates the accumulators $A_k$ for k=1, 2, ..., K. Decision block 230 and block 240 are executed in sequence K times (i.e., blocks 230 and 240 for k=1, blocks 230 and 240 for k=2, ..., blocks 230 and 240 for k=K). Block 250 is not executed until blocks 230 and 240 are executed in sequence K times. Decision block 230 asks whether $A_k \geq J_k$. If YES then B is incremented by 1 and $A_k$ is decremented by $J_k$, as described by Equations (32) and (33), respectively, in block 240. If NO, block 240 is bypassed.

As shown in Equation (34), block 250 calculates $X_n/Y$ by integer division to yield an integer quotient $Q_n$ and an integer remainder $R_n$ such that $R_n<Y$. In block 260 as described by Equation (35), $Z_n$ is set equal to $Q_n$. Also in block 260, Equation (36) updates the accumulator B. Decision block 270 asks whether B≧Y. If YES then $Z_n$ is incremented by 1 and B is decremented by Y, as described by Equations (37) and (38), respectively, in block 280. If NO, block 280 is bypassed. In block 290, Equation (39) updates the calculation of Z in accordance with Equation (25) supra.

Decision block 300 asks whether there are more iterations to execute. If YES, the return path 310 directs the processing back to block 210 to begin the next loop iteration. If NO, the processing breaks the loop and executes post-processing in block 320. The post-processing block may adjust the calculation of Z to reflect the fact that after completion of all iterations, the accumulators B and $A_k$ (k=1, 2, ..., K) may have non-zero integer contents. Thus Z may be adjusted in the post processing block 320 according to:

$$Z = Z + [B + \Sigma_k(A_k/J_k)]/Y \qquad (40)$$

wherein the summation over k in Equation (40) is from 1 to K. All calculations in Equation (40) should be performed in floating point. Thus, after Equation (40) is implemented, Z will be a floating point, or decimal, number.

The flow chart of FIG. 7 may be modified in any manner that is logically equivalent to FIG. 7 as shown herein, as would be understood by one of ordinary skill in the art. For example, if any $J_k$=1 then Equation (29) in block 210 could be simplified to $Q_{k'n} = I_{k'n}$ and $R_{k'n}$=0. Additionally if $J_{k'}$=1, then accumulator $A_k$ need not be defined and Equation (26), Equation (31), and blocks 230 and 240 may be skipped for k=k', and the summation over k in Equation (40) does not include k=k'. As another example, if Y=1 (i.e., if $Z_n=X_n$ in Equation (23)), then Equation (34) in block 250 could be simplified to $Q_n=X_n$ and $R_n=0$. Additionally if Y=1, then accumulator B need not be defined and Equation (27), Equation (36), and blocks 270 and 280 may be skipped, and division by Y in Equation (40) may be skipped. As another example some or all of the intitializations block 200, or mathematical equivalents thereof, could alternatively be performed within the iteration loop of FIG. 7, but only at the beginning of the first iteration, since the variables Z, B, and $A_k$ (k=1, 2. ..., K) are iteration-dependent variables.

Figure 8:
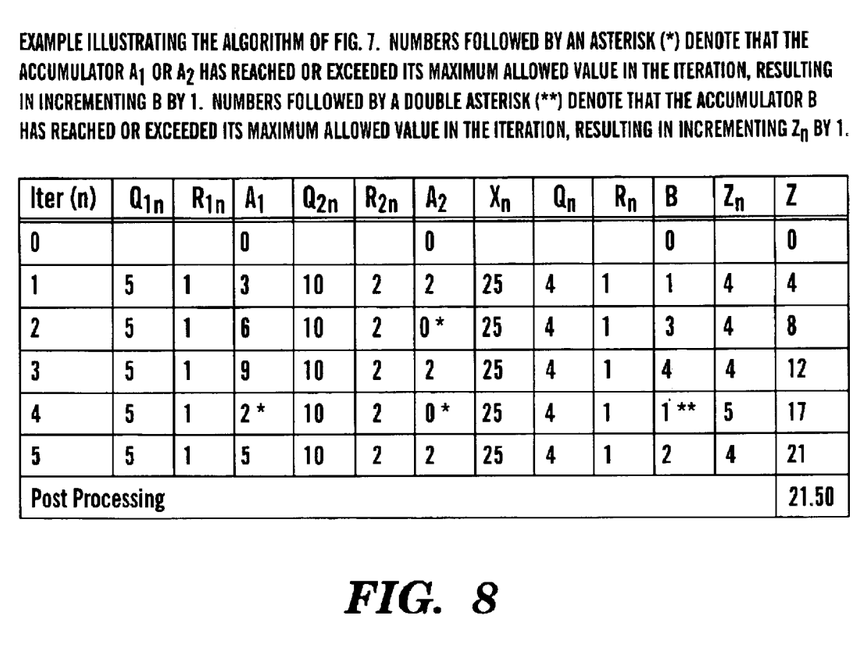
FIG. 8 is a table illustrating iterations of FIG. 7 for an example, in accordance with embodiments of the present invention.

FIG. 8 illustrates use of the algorithm of FIG. 7 to compute Z for the following example:

$$Z_n=[(51/10)*3+(42/4)]/6$$

and N=5 (i.e., 5 iterations). In this example, $X_n=(51/10)*3+(42/4)$, Y=6, K=2, $I_{1n}=51$, $J_1=10$, $M_{1n}=3$, $I_{2n}=42$, $J_2=4$, and $M_{2n}=1$. A floating point calculation yields $X_n=25.8$, $Z_n=4.30$, Z=21.50 (i.e., 5*4.30). Thus Z=21.50 is an exact value.

FIG. 8 shows that the method of FIG. 7, together with application of Equation (40) for the post-processing of block 320 of FIG. 7, yields the exact value of Z=21.50. In applying Equation (40) and using the values of $A_1$, $A_2$, and B from FIG. 8 at the end of iteration 5:

$$Z=Z+[B+(A_1/J_1)+(A_2/J_2)]/Y$$

$$=21+[2+(5/10)+(2/4)]/6$$

$$=21.50$$

which agrees with the exact value computed supra.

Figure 9:
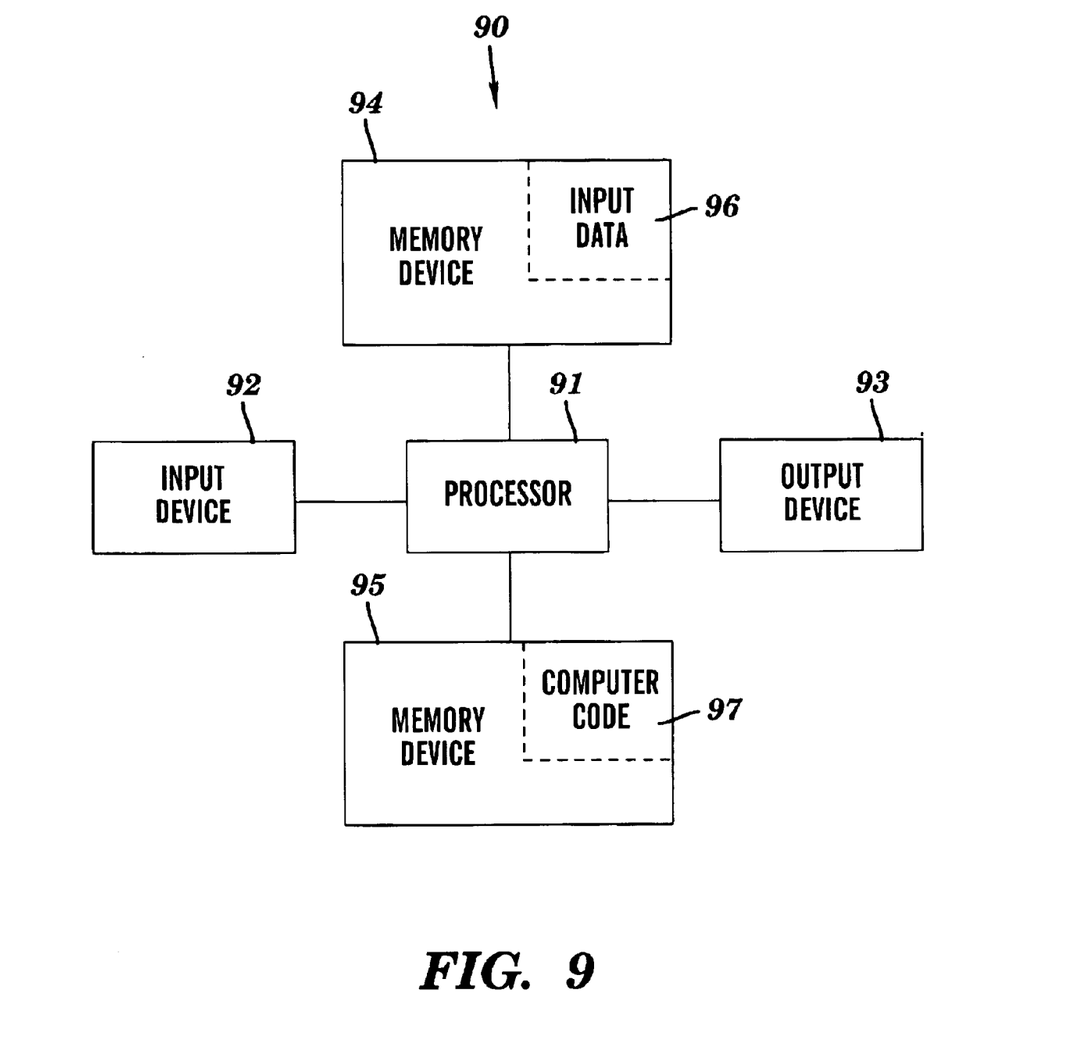
FIG. 9 illustrates a computer system, in accordance with embodiments of the present invention.

FIG. 9 illustrates a computer system 90, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes a computer code 97. The computer code or codes 97 includes at least one of the algorithms associated with FIGS. 1–3, FIG. 2, FIG. 3, FIG. 6, and FIG. 7, as described supra herein. The memory device 94 includes input data 96. The input data 96 includes input required by the computer code or codes 97. The output device 93 displays output from the computer code or codes 97. For example, the output device 93 may include BA_FINAL output from the algorithm of FIG. 1, BA_FINAL1 output from the algorithm of FIG. 2, BA_FINAL2 output from the algorithm of FIG. 3, BA output from the algorithm of FIG. 6, and Z output from the algorithm of FIG. 7.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

We claim:

1. A method for computing an average bits/frame (BA) for frames extracted from a buffer used for video encoding and decoding, each said frame having a same number of fields, said BA equal to (BR+BR1/J1)/J2, said BR1, J1, and J2 each a positive integer, said BR a bit rate in bits/sec, BR1/BR being a positive integer, said method comprising:

determining BR1, J1, and J2 such that J2/(1+(BR1/BR)/J1) as evaluated in floating point is approximately equal to FR, said FR a frame rate in frames/sec;

calculating a quotient Q1 and remainder R1 from integer division of BR1 by J1;

calculating a quotient Q2 and remainder R2 from integer division of (BR+Q1) by J2;

initializing to zero accumulators A1 and A2; and executing N iterations, wherein N>1, and wherein executing each iteration includes:

adding R1 to A1;

if A1≧J1, then adding 1 to A2 and decrementing A1 by J1;

setting BA=Q2 and adding R2 to A2;

if A2≧J2, then adding 1 to BA and decrementing A2 by J2.

2. The method of claim 1, wherein determining BR1, J1, and J2 includes computing BR1, J1, and J2.

3. The method of claim 1, wherein determining BR1, J1, and J2 includes receiving as input BR1, J1, and J2.

4. The method of claim 1, wherein J1 is a multiple of 10.

5. The method of claim 1, wherein J1>J2.

6. A computer code that computes an average bits/frame (BA) for frames extracted from a buffer used for video encoding and decoding, said computer code being stored on a computer readable medium, each said frame having a same number of fields, said BA equal to (BR+BR1/J1)/J2, said BR1, J1, and J2 each a positive integer, said BR a bit rate in bits/sec, BR1/BR being a positive integer, said computer code including an algorithm programmed to:

determine BR1, J1, and J2 such that J2/(1+(BR1/BR)/J1) as evaluated in floating point is approximately equal to FR, said FR a frame rate in frames/sec;

calculate a quotient Q1 and remainder R1 from integer division of BR1 by J1;

calculate a quotient Q2 and remainder R2 from integer division of (BR+Q1) by J2;

initialize to zero accumulators A1 and A2; and execute N iterations, wherein N>1, and wherein to execute each iteration includes:

to add R1 to A1;

if A1≧J1, then to add 1 to A2 and to decrement A1 by J1;

to set BA=Q2 and to add R2 to A2; and if A2≧J2, then to add 1 to BA and to decrement A2 by J2.

7. The computer code of claim 6, wherein to determine BR1, J1, and J2 includes to compute BR1, J1, and J2.

8. The computer code of claim 6, wherein to determine BR1, J1, and J2 includes to receive as input BR1, J1, and J2.

9. The computer code of claim 6, wherein J1 is a multiple of 10.

10. The computer code of claim 6, wherein J1>J2.

11. A method of computing an average bits/frame (BA) for frames extracted from a buffer used for video encoding and decoding, each said frame having a variable number of fields, comprising:

defining BA1 as an average bits/frame for a two-field frame, said BA1 equal to (BR+BR1/J1)/J2, said BR1, J1, and J2 each a positive integer, said BR a bit rate in bits/sec, BR1/BR being a positive integer;

defining BA2 as an average bits/frame for a one-field frame, said BA2 equal to (BR+BR1/J1)/(2*J2);

determining BR1, J1, and J2 such that J2/(1+(BR1/BR)/J1) as evaluated in floating point is approximately equal to FR, said FR a frame rate in frames/sec;

calculating a quotient Q1 and remainder R1 from integer division BR1/J1;

calculating a quotient Q2 and remainder R2 from integer division (BR+Q1)/J2;

calculating a quotient Q3 and remainder R3 from integer division (BR+Q1)/(2*J2);

initializing to zero accumulators A1, A2, B1, and B2;

executing N iterations, wherein N>1, said executing iteration n of N relating to extracting a frame n from the buffer, said executing of iteration n including:

calculating BA1, including;
  adding R1 to A1;
  if A1≧J1 then adding 1 to A2 and decrementing A1 by J1;
  setting BA1=Q2 and adding R2 to A2;
  if A2≧J2, then adding 1 to BA1 and decrementing A2 by J2;
determining a number of fields $F_n$ comprised by the frame n;
if $F_n$ is even then setting BA2=0 else calculating BA2 including:
  adding R1 to B1;
  if B1≧J1, then adding 1 to B2 and decrementing B1 by J1;
  setting BA2=Q3 and adding R3 to B2;
  if B2≧(2*J2), then adding 1 to BA2 and decrementing B2 by (2*J2);
computing BA=$(F_n/2)$*BA1+BA2, said $(F_n/2)$ computed by integer division.

12. The method of claim 11, wherein $F_n$ is 2 or 3.

13. The method of claim 11, wherein determining BR1, J1, and J2 includes computing BR1, J1, and J2.

14. The method of claim 11 wherein determining BR1, J1, and J2 includes receiving as input BR1, J1, and J2.

15. The method of claim 11, wherein J1 is a multiple of 10.

16. The method of claim 11, wherein J1>J2.

17. A computer code that computes an average bits/frame (BA) for frames extracted from a buffer used for video encoding and decoding, said computer code being stored on a computer readable medium, each said frame having a variable number of fields, said BA a function of BA1 and BA2, said BA1 defined as an average bits/frame for a two-field frame, said BA1 equal to (BR+BR1/J1)/J2, said BR1, J1, and J2 each a positive integer, said BR a bit rate in bits/sec, BR1/BR being a positive integer, said BA2 defined as an average bits/frame for a one-field frame, said BA2 equal to (BR+BR1/J1)/(2*J2), said computer code including an algorithm, said algorithm programmed to:

determine BR1, J1, and J2 such that J2/(1+(BR1/BR)/J1) as evaluated in floating point is approximately equal to FR, said FR a frame rate in frames/sec;

calculate a quotient Q1 and remainder R1 from integer division BR1/J1;

calculate a quotient Q2 and remainder R2 from integer division (BR+Q1)/J2;

calculate a quotient Q3 and remainder R3 from integer division (BR+Q1)/(2*J2);

initialize to zero accumulators A1, A2, B1, and B2;

execute N iterations, wherein N>1, said iteration n of N relating to extracting a frame n from the buffer, wherein to execute iteration n includes:

to calculate BA1, including:
  to add R1 to A1;
  if A1≧J1 then to add 1 to A2 and to decrement A1 by J1;
  to set BA1=Q2 and to add R2 to A2;
  if A2≧J2, then to add 1 to BA1 and to decrement A2 by J2;
to determine a number of fields $F_n$ comprised by the frame n;
if $F_n$ is even then to set BA2=0 else to calculate BA2 including:
  to add R1 to B1;
  if B1≧J1, then to add 1 to B2 and to decrement B1 by J1;
  to set BA2=Q3 and to add R3 to B2;
to compute BA=$(F_n/2)$*BA1+BA2, said $(F_n/2)$ computed by integer division.

18. The computer code of claim 17, wherein $F_n$ is 2 or 3.

19. The computer code of claim 17, wherein to determine BR1, J1, and J2 includes to compute BR1, J1 and J2.

20. The computer code of claim 17 wherein to determine BR1, J1, and J2 includes to receive as input BR1, J1, and J2.

21. The computer code of claim 17, wherein J1 is a multiple of 10.

22. The computer code of claim 17 wherein J1>J2.

23. A computer system comprising a processor, a computer readable memory unit coupled to the processor, and an output device, said memory unit containing instructions that when executed by the processor implement a method for computing Z, said Z=$\Sigma_n Z_n$, said $\Sigma_n$ denoting a summation over n from 1 to N, said N a positive integer of at least 1, said $Z_n = X_n / Y$, said $X_n = (I_{1n}/J_1)M_{1n} + (I_{2n}/J_2)M_{2n} + \ldots + (I_{Kn}/J_K)M_{Kn}$, said Y and said $I_{kn}$, $J_k$, $M_{kn}$ (k=1, 2, ..., K) each a positive integer, said K a positive integer of at least 1, said method comprising:

setting Z=0, B=0, and $A_k$=0 for k=1, 2, ..., K;

executing N iterations, said executing of iteration n of N including:

calculating a quotient $Q_{kn}$ and a remainder $R_{kn}$ from integer division $I_{kn}/J_k$ for k=1, 2, ..., K;

calculating $X_n = \Sigma_k [Q_{kn} M_{kn}]$ as summed over k from 1 to K;

adding $R_{kn} M_{kn}$ to $A_k$ for k=1, 2, ..., K;

for k=1, 2, ..., K, if $A_k \geq J_k$, then adding 1 to B and decrementing $A_k$ by $J_k$;

if Y≠1 then calculating a quotient $Q_n$ and a remainder $R_n$ from integer division $X_n/Y$, else setting $Q_n=X_n$ and $R_n=0$;

setting $Z_n=Q_n$ and adding $R_n$ to B;

if B≧Y, then calculating $Z_n=Z_n+1$ and decrementing B by Y;

adding $Z_n$ to Z;

after said executing N iterations, outputting Z to said output device.

24. The method of claim 23, further comprising:

computing S=B+$\Sigma_k(A_k/J_k)$]/Y), said $\Sigma_k(A_k/J_k)$ denoting a summation over k from 1 to K, said S computed in floating point; and adding S to Z.

25. The method of claim 23, wherein Y≠1.

26. The method of claim 23, wherein Y=1.

27. A computer code that computes Z, said Z=$\Sigma_n Z_n$, said $\Sigma_n$ denoting a summation over n from 1 to N, said N a positive integer of at least 1, said $Z_n=X_n/Y$, said $X_n=(I_{1n}/J_1)M_{1n}+(I_{2n}/J_2)M_{2n}+ \ldots +(I_{Kn}/J_K)M_{Kn}$, said Y and said $I_{kn}$, $J_k$, $M_{kn}$ (k=1, 2, ..., K) each a positive integer, said K a positive integer of at least 1, said computer code being stored on a computer readable medium comprised by a computer system, said computer code adapted to be executed on a processor of said computer system, said computer system including an output device, said computer code including an algorithm, said algorithm programmed to:

set Z=0, B=0, and $A_k$=0 for k=1, 2, ..., K;

execute N iterations, wherein to execute iteration n of N includes:
  to calculate a quotient $Q_{kn}$ and a remainder $R_{kn}$ from integer division $I_{kn}/J_k$ for k=1, 2, ..., K;
  to calculate $X_n=\Sigma_k[Q_{kn}M_{kn}]$ as summed over k from 1 to K;
  to add $R_{kn}M_{kn}$ to $A_k$ for k=1, 2, ..., K;
  for k=1, 2, ..., K, if $A_k \geq J_k$, then to add 1 to B and to decrement $A_k$ by $J_k$;
  if Y≠1 then to calculate a quotient $Q_n$ and a remainder $R_n$ from integer division $X_n/Y$, else to set $Q_n=X_n$ and $R_n$=0;
  to set $Z_n=Q_n$ and to add $R_n$ to B;
  if B≥Y, then to calculate $Z_n=Z_n+1$ and to decrement B by Y;
  to add $Z_n$ to Z.

output Z to said output device after said N iterations have been executed.

28. The computer code of claim 27, said algorithm further programmed to:
  compute $S=[B+\Sigma_k(A_k/J_k)]/Y$, said $\Sigma_k(A_k/J_k)$ denoting a summation over k from 1 to K, said S computed in floating point; and
  add S to Z.

29. The computer code of claim 27, wherein Y≠1.

30. The computer code of claim 27, wherein Y=1.

31. A computer program product, comprising a computer usable medium having a computer readable program code embodied therein, wherein the computer code computes an average bits/frame (BA) for frames extracted from a buffer used for video encoding and decoding, each said frame having a same number of fields, said BA equal to (BR+BR1/J1)/J2, said BR1, J1, and J2 each a positive integer, said BR a bit rate in bits/sec, BR1/BR being a positive integer, said computer code including an algorithm programmed to:

determine BR1, J1, and J2 such that J2/(1+(BR1/BR)/J1) as evaluated in floating point is approximately equal to FR, said FR a frame rate in frames/sec;

calculate a quotient Q1 and remainder R1 from integer division of BR1 by J1;

calculate a quotient Q2 and remainder R2 from integer division of (BR+Q1) by J2;

initialize to zero accumulators A1 and A2; and execute N iterations, wherein N>1, and wherein to execute each iteration includes:
  to add R1 to A1;
  if A1≥J1, then to add 1 to A2 and to decrement A1 by J1;
  to set BA=Q2 and to add R2 to A2; and
  if A2≥J2, then to add 1 to BA and to decrement A2 by J2.

32. A computer program product, comprising a computer usable medium having a computer readable program code embodied therein, wherein the computer code computes an average bits/frame (BA) for frames extracted from a buffer used for video encoding and decoding, each said frame having a variable number of fields, said BA a function of BA1 and BA2, said BA1 defined as an average bits/frame for a two-field frame, said BA1 equal to (BR+BR1/J1)/J2, said BR1, J1, and J2 each a positive integer, said BR a bit rate in bits/sec, BR1/BR being a positive integer, said BA2 defined as an average bits/frame for a one-field frame, said BA2 equal to (BR+BR1/J1)/(2*J2), said computer code including an algorithm, said algorithm programmed to:

determine BR1, J1, and J2 such that J2/(1+(BR1/BR)/J1) as evaluated in floating point is approximately equal to FR, said FR a frame rate in frames/sec;

calculate a quotient Q1 and remainder R1 from integer division BR1/J1;

calculate a quotient Q2 and remainder R2 from integer division (BR+Q1)/J2;

calculate a quotient Q3 and remainder R3 from integer division (BR+Q1)/(2*J2);

initialize to zero accumulators A1, A2, B1, and B2;

execute N iterations, said N at least 1, said iteration n of N relating to extracting a frame n from the buffer, wherein to execute iteration n includes:
  to calculate BA1, including;
    to add R1 to A1;
    if A1≥J1 then to add 1 to A2 and to decrement A1 by J1;
    to set BA1=Q2 and to add R2 to A2;
    if A2≥J2, then to add 1 to BA1 and to decrement A2 by J2;
  to determine a number of fields $F_n$ comprised by the frame n;
  if $F_n$ is even then to set BA2=0 else to calculate BA2 including:
    to add R1 to B1;
    if B1≥J1, then to add 1 to B2 and to decrement B1 by J1;
    to set BA2=Q3 and to add R3 to B2;
  to compute BA=$(F_n/2)$*BA1+BA2, said $(F_n/2)$ computed by integer division.

33. A computer program product, comprising a computer usable medium having a computer readable program code embodied therein, wherein the computer code computes Z, said $Z=\Sigma_n Z_n$, said $\Sigma_n$ denoting a summation over n from 1 to N, said N a positive integer of at least 1, said $Z_n=X_n/Y$, said $X_n=(I_{1n}/J_1)M_{1n}+(I_{2n}/J_2)M_{2n}+ \ldots +(I_{Kn}/J_K)M_{Kn}$, said Y and said $I_{kn}$, $J_k$, $M_{kn}$ (k=1, 2, ..., K) each a positive integer, said K a positive integer of at least 1, said computer code including an algorithm, said computer code adapted to be executed on a processor of said computer system, said computer system including an output device, said algorithm programmed to:

set Z=0, B=0, and $A_k$=0 for k=1, 2, ..., K;

execute N iterations, wherein to execute iteration n of N includes:
  to calculate a quotient $Q_{kn}$ and a remainder $R_{kn}$ from integer division $I_{kn}/J_k$ for k=1, 2, ..., K;
  calculate $X_n=\Sigma_k[Q_{kn}M_{kn}]$ as summed over k from 1 to K;
  to add $R_{kn}M_{kn}$ to $A_k$ for k=1, 2, ..., K;
  for k=1, 2, ..., K, if $A_k \geq J_k$, then to add 1 to B and to decrement $A_k$ by $J_k$;
  if Y≠1 then to calculate a quotient $Q_n$ and a remainder $R_n$ from integer division $X_n/Y$, else to set $Q_n=X_n$ and $R_n$=0;

to set $Z_n=Q_n$ and to add $R_n$ to B;

if $B \geq Y$, then to calculate $Z_n=Z_n+1$ and to decrement B by Y;

to add $Z_n$ to Z.

output Z to said output device after said N iterations have been executed.

34. The method of claim 23, wherein the output device is selected from the group consisting of a printer, a computer screen, a magnetic tape, a removable hard disk, and a floppy disk.

35. The method of claim 27, wherein the output device is selected from the group consisting of a printer, a computer screen, a magnetic tape, a removable hard disk, and a floppy disk.

36. The method of claim 33, wherein the output device is selected from the group consisting of a printer, a computer screen, a magnetic tape, a removable hard disk, and a floppy disk.

* * * * *